(12) United States Patent
Chen et al.

(10) Patent No.: US 7,688,945 B2
(45) Date of Patent: Mar. 30, 2010

(54) SYSTEM FOR IMAGE INSPECTION OF MOVABLE OBJECT AND DODGING METHOD

(75) Inventors: Zhiqiang Chen, Beijing (CN); Yuanjing Li, Beijing (CN); Yinong Liu, Beijing (CN); Junli Li, Beijing (CN); Hua Peng, Beijing (CN); Yaohong Liu, Beijing (CN); Shangmin Sun, Beijing (CN); Jinyu Zhang, Beijing (CN); Qingjun Zhang, Beijing (CN); Li Zhang, Beijing (CN); Yali Xie, Beijing (CN); Yanli Deng, Beijing (CN); Ming Ruan, Beijing (CN); Siyuan Liang, Beijing (CN); Guang Yang, Beijing (CN); Wei Jia, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 11/997,443

(22) PCT Filed: Dec. 25, 2006

(86) PCT No.: PCT/CN2006/003573

§ 371 (c)(1),
(2), (4) Date: Feb. 27, 2008

(87) PCT Pub. No.: WO2008/046260

PCT Pub. Date: Apr. 24, 2008

(65) Prior Publication Data

US 2009/0225939 A1   Sep. 10, 2009

(30) Foreign Application Priority Data

Oct. 13, 2006  (CN) .................... 2006 1 0113714

(51) Int. Cl.
*G01N 23/04* (2006.01)

(52) U.S. Cl. .......................................... 378/62; 378/57
(58) Field of Classification Search .................. 378/57, 378/62, 101, 121, 106, 146; 250/358.1, 306
See application file for complete search history.

(56) References Cited

U.S. PATENT DOCUMENTS 5,046,078 A   9/1991   Hernandez et al. .......... 378/119

(Continued)

FOREIGN PATENT DOCUMENTS

| CN | 1242519 | 1/2000 |
| CN | 2469444 | 1/2002 |
| CN | 1482844 | 3/2004 |

OTHER PUBLICATIONS

"International Search Report and written Opinion", PCT/CN2006/003573.

*Primary Examiner*—Irakli Kiknadze
(74) *Attorney, Agent, or Firm*—Westman, Champlin & Kelly, P.A.

(57) ABSTRACT

The present invention discloses a system for imaging inspection of a movable object is provided, comprising: a first detecting unit configured to inspect whether a moving object to be inspected moves into a passage or not; a second detecting unit for inspecting whether a part to be shielded of the moving object passes into the passage or not and generating a passing signal after the first detecting unit inspects that the moving object to be inspected moves into the passage; a scan imaging device for emitting radiating beams for scan inspecting the moving object to be inspected; and a control system for generating a control signal for controlling the emitted radiating beams from the scan imaging device according to the passing signal from the second detecting unit. With the above system thereof, the imaging inspection of the moving object with rapid speed can be undertaken safely and reliably.

12 Claims, 4 Drawing Sheets

U.S. PATENT DOCUMENTS

| | | | |
|---|---|---|---|
| 5,838,759 A * | 11/1998 | Armistead | 378/57 |
| 6,031,890 A | 2/2000 | Bermbach et al. | 378/57 |
| 6,507,025 B1 | 1/2003 | Verbinski et al. | 250/358.1 |
| 7,039,159 B2 | 5/2006 | Muenchau et al. | 378/57 |
| 7,110,500 B2 * | 9/2006 | Leek | 378/111 |
| 2006/0269042 A1 * | 11/2006 | Muhanna et al. | 378/57 |
| 2007/0165777 A1 * | 7/2007 | Anwar et al. | 378/57 |
| 2008/0205583 A1 * | 8/2008 | Seppi et al. | 378/9 |
| 2009/0041187 A1 * | 2/2009 | Peschmann et al. | 378/57 |

* cited by examiner

SYSTEM FOR IMAGE INSPECTION OF MOVABLE OBJECT AND DODGING METHOD

CROSS-REFERENCE TO RELATED APPLICATION

This Application is a Section 371 National Stage Application of International Application No. PCT/CN2006/003573, filed Dec. 25, 2006 not yet published, the content of which is hereby incorporated by reference in its entirety

FIELD OF THE INVENTION

The present invention generally relates to a scan imaging process for a moving object, especially to a scan imaging process when the object runs in non-uniform speed and incomplete rapid imaging is required. More specifically, the present invention relates to a device for imaging inspection of a movable object and a dodging method thereof.

BACKGROUND OF INVENTION

A device for inspecting a vehicle using high energy rays is one of typical examples of devices for imaging inspection of a moving object. In a device for vehicle inspection with high energy rays, the vehicle to be inspected dragged by a dragging device runs uniformly, and an accelerator of the device continuously emits high energy rays with constant frequency. The device has a block plate for shielding the rays, and whether the high energy rays irradiate toward the vehicle to be inspected or not is controlled by the block plate. When the block plate is opened, the high energy rays emit toward the object to be inspected, and the object is scanned, imaged and inspected finally.

In the conventional device, the cost thereof is high since the accelerator normally opens. Meanwhile, since the emission of high energy rays is controlled by opening/closing of the mechanical block plate, the response speed is slow, the inspection time is long and the vehicle inspecting efficiency is low.

SUMMARY OF THE INVENTION

To overcome defects in conventional art, an object of the invention is to provide a device for imaging inspection of a movable object and a dodging method thereof, which can emit beams rapidly after parts to be shielded of the moving object are dodged, with high response speed and low manufacture cost.

To achieve the above objects, technical solutions are achieved with the following technical solutions.

A system for imaging inspection of a movable object, comprising: a first detecting unit configured to detect whether a moving object to be inspected moves into a passage or not; a second detecting unit configured to detect whether a part to be shielded of the moving object passes into the passage or not and generate a passing signal after the first detecting unit detects that the moving object to be inspected moves into the passage; a scan imaging device configured to emit radiating beams for inspecting the moving object to be inspected by scanning; and a control system configured to generate a control signal for controlling the scan imaging device to generate the radiating beams according to the passing signal from the second detecting unit.

In the above system for imaging inspection of a movable object, the scan imaging device comprises an accelerator having:

a microwave system configured to generate microwave electromagnetic field; an electron beam emitting device configured to emit electron beams; and an accelerating device configured to receive microwaves generated from the microwave device to form the microwave electromagnetic field for accelerating electron beams generated from the electron beam emitting device and directing the accelerated electron beams to a targeting in order to generate X ray beam.

In the above system for imaging inspection of a movable object, the control system starts the microwave system when the first detecting unit detects the signal of the moving object to be inspected passing into the passage, and generates a control signal for controlling the electron beam emitting device to generate electron beam after the passing signal is received.

In the above system for imaging inspection of a movable object, the electron beam emitting device comprises: an electron gun triggering control device for generating a triggering synchronous signal when a signal allowing the electron gun to be operated is enabled; a pulsing device for generating a first high voltage pulse according to the triggering synchronous signal generated by the electron gun triggering control device; and an electron gun for emitting electron beams according to the first high voltage pulse.

In the above system for imaging inspection of a movable object, the control system starts the microwave system when the first detecting unit inspects the signal of the moving object to be inspected passing into the passage, and generates a control signal for controlling the electron beam emitting device to generate electron beam after the passing signal is received.

In the above system for imaging inspection of a movable object, the microwave system comprises: a microwave pulse device for generating a second high voltage pulse; and a microwave source for receiving the second high voltage pulse and generating microwave.

In the above system for imaging inspection of a movable object, the control signal is generated after the microwave electromagnetic field is stabilized.

In the above system for imaging inspection of a movable object, the moving object may be a vehicle. Further, the part to be shielded may be a driving cab of the vehicle.

According another aspect of the invention, a dodging method for a moving object being image inspected is provided, comprising:

a first determining step of judging whether the moving object moves into a passage or not;

a second determining step of judging whether a part to be shielded of the moving object passes through a radiating scan area in the passage and generate a passing signal; and a scan imaging step of generating a control signal for controlling a scan imaging device to generate radiating beams according to the passing signal, after judging that the part to be shielded passes through the radiating scan area, to emit radiating beam to the passage and inspect the moving object by scanning to dodge the area to be shielded.

In the dodging method for a moving object being image inspected, after the first determining step, further comprising a step of triggering a microwave device of an accelerator of the scan imaging device for emitting the radiating beam to generate microwave when the moving object passes into the passage and a step of triggering an electron beam emitting device of the accelerator to emit electron beam during the step of the scan inspection.

In an embodiment of the invention, a system for vehicle inspection using high energy rays is provided. And a driver does not need to get down with the inspected vehicle running at a certain speed. After the front part of the vehicle is dodged, the system emits radiating beam with extremely rapid responsive speed, thus shortening inspect time, and a 100% inspection ratio is achieved and the vehicle passing ratio is enhanced.

With the solution of the invention, the passing ratio of the vehicle can be increased to 200 container trucks per hour. Compared with conventional art, the vehicle inspection ratio can be greatly enhanced and the device cost can be remarkably decreased with less area to be occupied by the device thereof. And the device thereof can be utilized at all kinds of road toll gates.

BRIEF DESCRIPTION OF THE DRAWING

These and/or other aspects and advantages of the present invention will be more readily apparent from the following detailed description of preferred embodiments when taken together with the accompanying drawings.

DETAILED DESCRIPTION OF THE PREFERRED EMBODIMENTS

Figure 1:
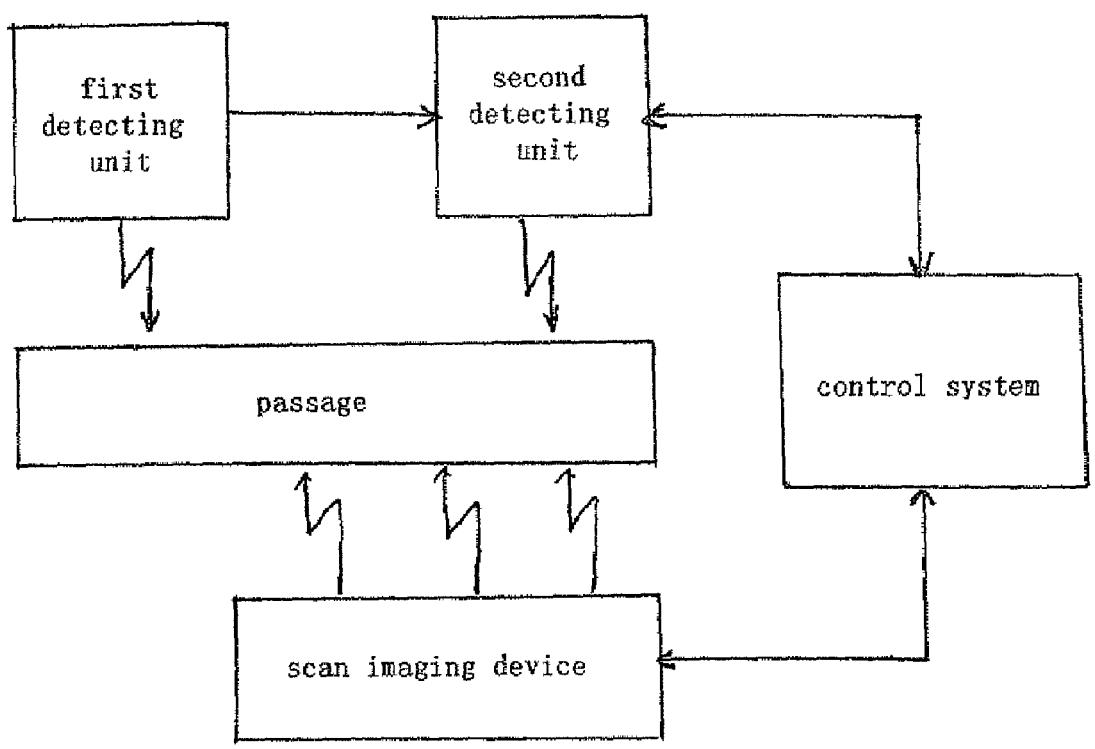
FIG. 1 is a block diagram according to a vehicle inspecting system of an embodiment of the invention.

Reference will now be made in detail to the embodiment of the present invention, examples of which are illustrated in the accompanying drawings, wherein like reference numerals refer to the like elements throughout. The embodiments are described below to explain the present invention by referring to the figures.

As shown in the appended figures, an embodiment with a device for rapid vehicle inspection is illustrated. The following description would be described with reference to figures and only for illustration purpose rather than for limitation.

FIG. 1 is a block diagram according to a system for rapid imaging inspection of a vehicle of an embodiment of the invention. As shown in FIG. 1, the system for rapid imaging inspection comprises: a first detecting unit 101 configured to detect whether a moving object 15 to be inspected moves into a passage 14 or not; a second detecting unit 201 configured to detect whether a part 16 to be shielded of the moving object 15 passes into an inspection area, i.e. the area to be scanned using radiating beams, in the passage or not, and generating a passing signal after the first detecting unit 101 detects that the moving object 15 to be inspected moves into the passage; a scan imaging device 104 for emitting radiating beams, such as X rays or Y rays etc., to scan the moving object 15 to be inspected; and a control system 103 for generating a control signal for controlling the emitted radiating beams from the scan imaging device 104 according to the passing signal from the second detecting unit 102.

Figure 2:
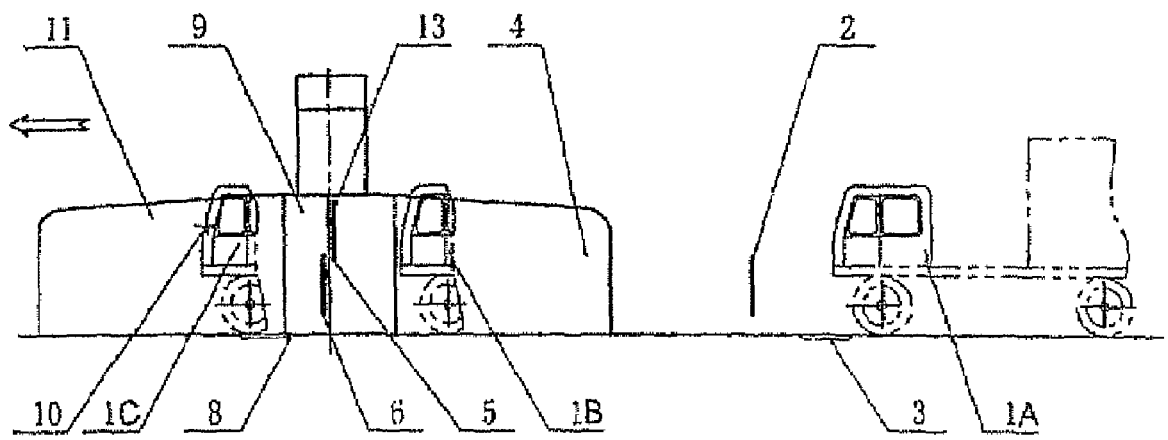
FIG. 2 is a schematic view according to a vehicle inspecting system of an embodiment of the invention.
Figure 3:
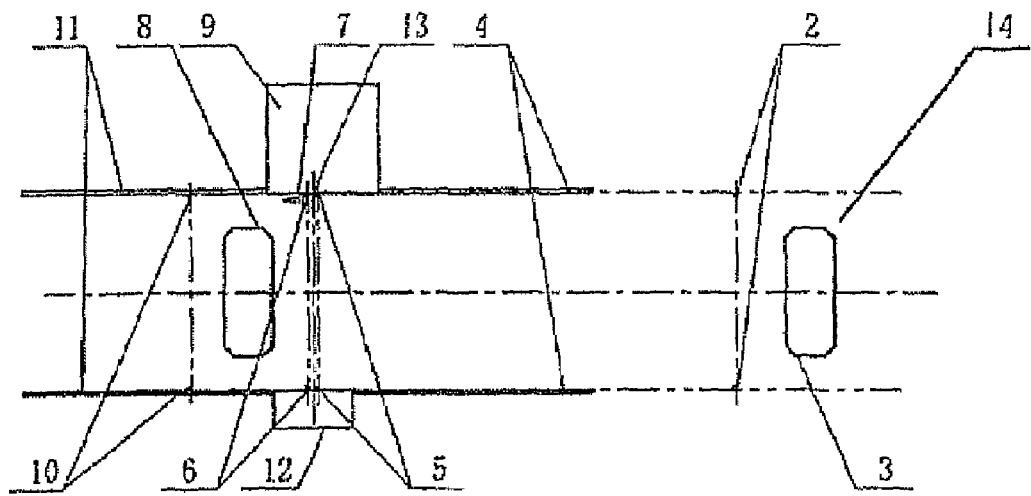
FIG. 3 is plan view of the device as shown in FIG. 1.

FIG. 2 is a schematic view of an inspecting device for a moving object to be scanned by imaging according to an embodiment of the invention, and FIG. 3 is plan view of the device as shown in FIG. 1. With reference to FIGS. 2, 3, a passage 14 for moving object to be inspected which is loaded with a container etc., an accelerator cabin body 9 provided with the scan imaging device provided therein, rapid responsive light curtain switches 2 and a ground induction coil 3 for detecting vehicle driving into the passage, and a speed measuring radar 7 for measuring vehicle speed and a control room (not shown) are shown. The rapid responsive light curtain switches 2 are provided on installing posts at both sides of the passage. The ground induction coil 3 is embedded under the ground of the passage inlet (near the right side in FIG. 2) as a first switch at the vehicle inlet. The rapid responsive light curtain switches 2 and the ground induction coil 3 can be used together for determining whether the moving object to be inspected moves into the passage 14 or not, and counting the vehicle passed therein with a counter. The counter can be provided in the control room, and it can also be separately provided. The speed measuring radar 7 can measure the moving speed of the moving object to be inspected. In the embodiment of the invention, it can be provided at an outer wall of the accelerator cabin body 9 neighboring the passage. The control room is the center of the whole system, the control system in the control room can be electrically connected to other kinds of electrical apparatuses in the whole device, for receiving the electrical signals of these electrical apparatuses and emitting control signals to these electrical apparatuses, and further controlling the operation status thereof.

Rapid responsive light curtain switches 5 are provided on the walls at both sides of the passage and an arm 12 of a detector. Photoelectric switches 10 are provided at shielding walls 4 and 11 at both sides of the passage. The photoelectric switches 10 and the light curtain switches 5 are used for determining the type of the vehicle. And the control unit can control the triggering conditions, such as the time for emitting radiating beams, of the accelerator based on the determining results.

Specifically, in an embodiment in which photoelectric switches 10 and light curtain switches 5 are used for determining whether the moving object 15 passes through the inspection area or not, attribute information and profile information of a container truck, a van truck and a passenger car etc are stored in the control unit 103. The light curtain switch 5 is composed of a emitter and a receiver provided, such as, at both sides of the passage, and detects the height information of the vehicle outer shape based on the blocking situation of the light beam, and a notable attribute, such as the profile of the vehicle head, of the moving object 15 such as a vehicle passing through the passage can be obtained. The vehicle type can be determined by the control unit with the notable attribute of the vehicle or the partial profile attribute of the vehicle. When the forepart of the vehicle is detected by the photoelectric switch 10, an arriving signal is emitted to the control system 103. With the vehicle moving, the light curtain switches 5 detect the height information of the vehicle repeatedly and transfers the same to the control unit. The control unit retrieves the information from the receiver of the light curtain switch 5 into vehicle profile, and compares the measured vehicle information with that stored in the controller so as to discriminate the vehicle type.

Figure 4:
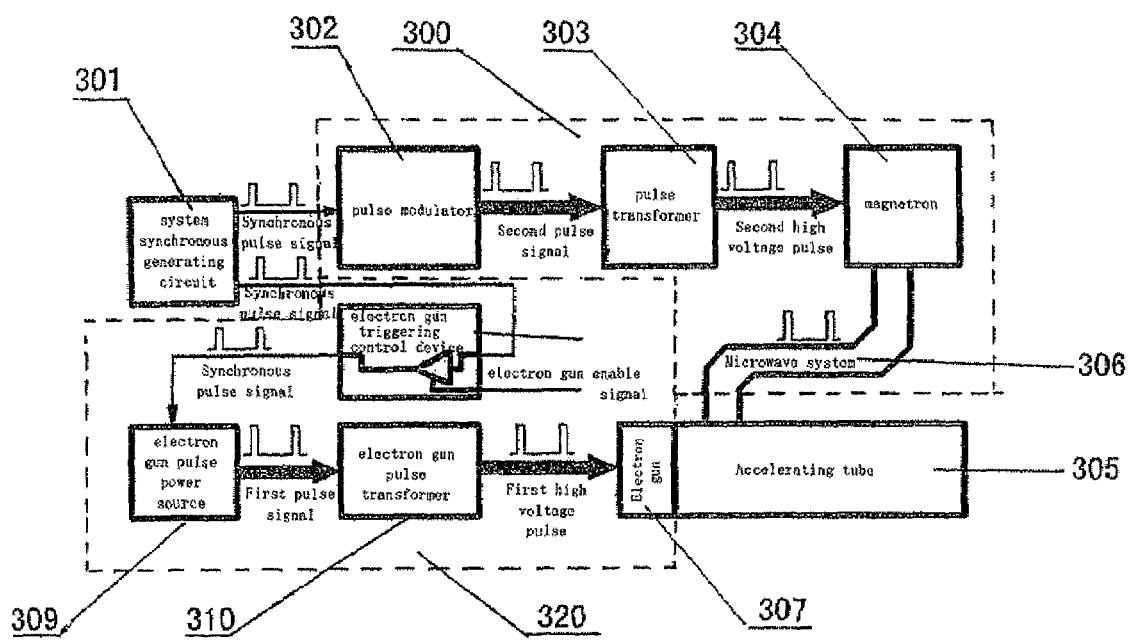
FIG. 4 is a schematic block view of an accelerator as shown in FIG. 1.
Figure 5:
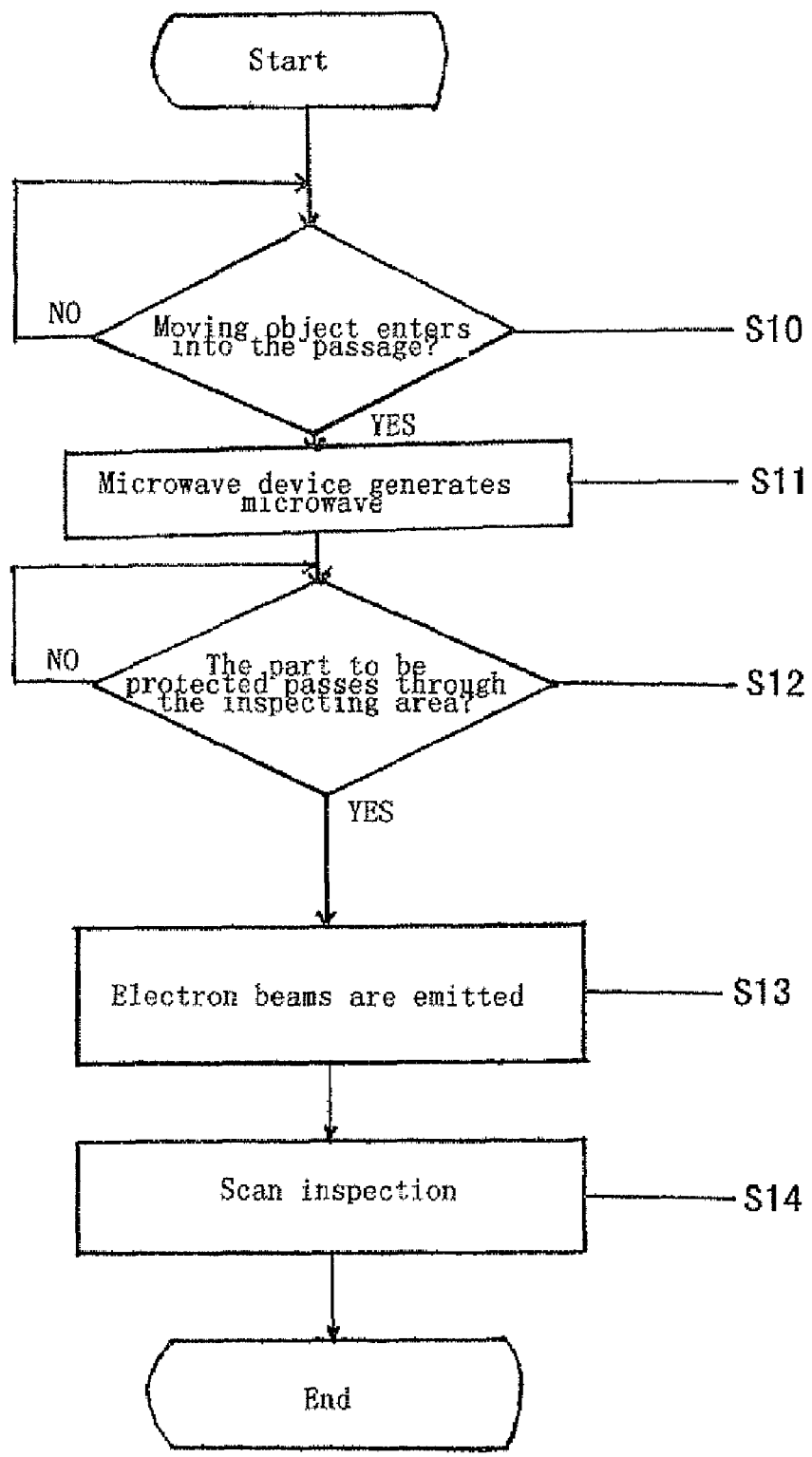
FIG. 5 is a flow chart of a dodging method of a moving object being image inspected according to the invention.

The scan imaging device 104 provided in the accelerator cabin body 9 comprises an accelerator which can rapidly emit radiating beams as shown in FIG. 4. The accelerator comprises: a microwave system 300 configured to generate microwave electromagnetic field; and an electron beam emitting device such as electron gun 307 etc. configured to emit electron beams triggered under high voltage pulse; an accelerating device such as an accelerating tube 305 etc. configured to receive microwaves generated from a magnetron 4 via a microwave transferring system to form microwave electromagnetic field, wherein the microwave electromagnetic field accelerates the electron beam generated by the electron gun 307 and directs the accelerated electron beam at a target so as to generate X ray beams with constant dosage; and a system synchronous generating circuit 301 for providing synchronous pulse signal to the microwave system 300 and a radiating beam emitting system 320.

Further, the microwave system comprises a microwave pulsing device, a microwave source such as a magnetron 304 etc and a microwave transfer system. The microwave pulsing device comprises a modulator 302 and a pulse transformer 303, the modulator 303 receives the system synchronous pulse signal from the system synchronous generating circuit 301 and generates a second pulse signal. The pulse transformer 303 converts the second pulse signal to a second high voltage pulse for driving the magnetron 30. The magnetron 304 receives the second high voltage pulse and generates microwave signal. The microwave transfer system 306 transfers the microwave to the accelerating tube 305 to form microwave electromagnetic field in the accelerating tube 305. Furthermore, the microwave system 300 further comprises AFC (automatic frequency control) frequency-stabilizing device. The AFC frequency-stabilizing device is configured to allow the microwave output frequency of the microwave source to consist with the frequency of the high voltage pulse, i.e. characteristic frequency, for driving the electron gun 310 generated by the accelerating device.

Further, the electron beam emitting device 320 may comprises an electron gun triggering control device 308, a pulse device and an electron gun 307, with the pulse device comprising a pulse power supply 309 and a pulse transformer 10. The electron gun triggering control device 308 receives the synchronous pulse signal, for example, emitted from the system synchronous generating circuit 301 in the control system 103 and enable signal allowing the electron gun 310 to operate, the enable signal can be enabled based on the local machine beam emitting instruction emitted from the control system 103, for example when the control system 103 sends beam emitting instruction after it determines that the vehicle part to be protected (such as driving cab) passes through the scanning area. Alternatively, the enable signal can be enabled according to external beam emitting instruction sent from other external operating mechanism based on the power stable status of the microwave generated by the magnetron 304. Alternatively, the enable signal can be enabled when such cases both occur. When the enable signal is enabled, the electron gun triggering control device 308 can generate a triggering synchronous signal to activate the pulse power supply 309 to generate a first pulse signal for the electron gun 307. The pulse transformer 310 can convert the first pulse signal generated by the pulse power supply 309 into a first high voltage pulse, and then the electron gun 307 is driven by the first high voltage pulse to emitting electro beam.

According to the accelerator of the invention, after the microwave system 300 starts work by the control system 103, the magnetron 304 starts work, however, the whole accelerator does not generate X ray beam stream. After the control system 103 determines that the driving cab part of the vehicle passes through the inspecting area, that is, after the magnetron 304 works for a period (normally requires 10 seconds), the system is activated by software, the AFC frequency-stabilizing device is operated and stabilized accelerating electric field is formed in the accelerating tube, then the control system 103 issues beam emitting instruction. The beam emitting instruction starts the pulse power supply 309 by the electron gun triggering control device 308 immediately and stable X ray pulse is generated in the accelerating tube 305 accordingly. Therefore, in the accelerator 104 of the invention, when the accelerator starts work, the microwave system 300 starts work immediately. However, the electron beam emitting device does not emit electron beam at the same time. And only when the beam emitting instruction is received by the control system 103, the electron beam emitting device is started to emit electron beam, and radiating beam for scan inspection is further emitted. Thus, not only the rapid beam emission of the accelerator is achieved, but also the part, such as the driving cab etc., that does not need to be scanned with the radiating beams can be dodged, and the damage to the driver due to the radiating beam can be prevented.

The system for imaging inspection of a movable object according to the invention further comprises a rapid responsive light curtain switch 6 and a ground induction coil 8 embedded under the ground of the passage at the exit direction to determine whether the vehicle to be inspected leaves the passage or not, and the inspected vehicle driving away from the passage 14 is counted with the counter.

The working process of the system for imaging inspection of a movable object according to the invention would be described as follows.

The system stands by when the vehicle number in the passage is zero. Firstly, the ground induction coils 3 are triggered when a vehicle 1A runs toward the passage, and the driving direction of the vehicle is determined in combination with the rapid responsive light curtain switches 2. If the vehicle drives into the passage, the counter for counting the vehicle in the passage increases by one. The speed measuring radar 7 measures the vehicle speed. And the system changes into ready state, and the control system 103 starts the microwave system 300 generating microwave, and the generated microwave is transferred to the accelerating tube 305 with the microwave transfer system 306 to form stable electric field in the accelerating tube 305. The vehicle keeps driving forward, the system records the status change of the vehicle driving in the passage.

The photoelectric switch 10 is triggered when the vehicle drives from 1A to 1C via 1B with normal speed. At this time, the vehicle inspected is determined to be a container truck or an enclosed van track based on the state of the light curtain switch 5, and different scan triggering conditions are adopted with the vehicle type. If the vehicle is an enclosed van truck, the electron gun 310 of the accelerator in the control system 300 emits electron beam immediately after the driving cab part passes by. The electron beams are accelerated with the electric field in the accelerating tube 305 and form radiating beams after targeting to inspect the enclosed van truck by scanning.

On the other hand, after the quick responsive light curtain switch 2 detects the vehicle driving into the passage 14, if the control system 300 determines that the container truck is passing through the passage 14 with the above light curtain switch 5, whether the driving cab of the vehicle passes through the inspecting area or not is detected and a passing signal is generated, after the driving cab part of the container truck has passed through the inspecting area, the control system 300 controls the electron gun 310 of the accelerator emitting electron beams immediately. The electron beams are accelerated with the electric field in the accelerating tube 305 and form radiating beams after shooting at a target to inspect the container truck by scanning.

When the vehicle drives out of the scanning passage, the vehicle counter decreases by one, and the whole accelerator enters into closing state by the controller 103, or the electron gun of the accelerator enters into closing state. The whole system for imaging inspection of a movable object maintains ready state if the countering number of the counter in the passage is not zero, and the system enters into standby state if the vehicle amount in the passage is zero.

Since the vehicle to be inspected can rapidly passes through the passage 14, and the safety of the driver should be ensured during the inspection of the vehicle, the accelerator is instructed with beam emitting instruction (the electron gun enable signal is enabled) after the system dodging the driving cab part safely, and the system requires the accelerator generating stable pulse beam stream after 100 ms when the enable signal is received. The accelerator outputs stable pulse beam stream after receiving 4 pulses of the electron gun enable signal (about 20 ms with the system normally working at 200 Hz) based on experimental detecting data. When the accelerator system is utilized, the vehicle inspection efficiency is enhanced. The time for inspecting a container truck is shortened from 2-3 minutes to 10 seconds or less. In addition, the device cost of the system is decreased accordingly.

With the above system for imaging inspection of a movable object of the invention, the rapid moving object can be image inspected rapidly, safely and reliably.

According to the invention, an image inspection method for moving object and an dodging method for a moving object being image inspected are provided, comprising: a first determining step S10 of judging whether the moving object such as a container truck, a van truck and a passenger car etc. moves into a passage or not; a second determining step S12 of judging whether an area to be shielded, such as the driving cab part, of the moving object passes through a radiating scan area; and a scan imaging step S14 of triggering the accelerator to emit radiating beams for scan inspection after the area to be shielded passes through the radiating scan area.

Further, in the first determining step, the method further comprise: a step S11 of triggering a microwave device of an accelerator to emitting radiating beam and generate microwave when the moving object passes into the passage after the first determining step; and a step S13 of triggering an electron beam emitting device of the accelerator to emit electron beam during the step S14 of the scan inspection.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A system for imaging inspection of a movable object, comprising:
    a first detecting unit configured to detect whether a moving object to be inspected moves into a passage or not;
    a second detecting unit configured to detect whether a part to be shielded of the moving object passes into the passage or not and generate a passing signal after the first detecting unit detects that the moving object to be inspected moves into the passage;
    a scan imaging device configured to emit radiating beams for inspecting the moving object to be inspected by scanning; and
    a control system configured to generate a control signal for controlling the scan imaging device to generate the radiating beams according to the passing signal from the second detecting unit.

2. The system for imaging inspection of a movable object according to claim 1, wherein the scan imaging device comprises an accelerator having:
    a microwave system configured to generate microwave electromagnetic field;
    an electron beam emitting device configured to emit electron beams; and
    an accelerating device configured to receive microwaves generated from the microwave device to form the microwave electromagnetic field for accelerating electron beams generated from the electron beam emitting device and directing the accelerated electron beams to a targeting in order to generate X ray beam.

3. The system for imaging inspection of a movable object according to claim 2, wherein the control system starts the microwave system when the first detecting unit detects the signal of the moving object to be inspected passing into the passage, and generates a control signal for controlling the electron beam emitting device to generate electron beam after the passing signal is received.

4. The system for imaging inspection of a movable object according to claim 3, wherein the control signal is generated after the microwave electromagnetic field is stabilized.

5. The system for imaging inspection of a movable object according to claim 2, wherein the electron beam emitting device comprises:
    an electron gun triggering control device for generating a triggering synchronous signal when a signal allowing the electron gun to be operated is enabled;
    a pulsing device for generating a first high voltage pulse according to the triggering synchronous signal generated by the electron gun triggering control device; and
    an electron gun for emitting electron beams according to the first high voltage pulse.

6. The system for imaging inspection of a movable object according to claim 2, wherein the microwave system comprises:
    a microwave pulse device for generating a second high voltage pulse; and
    a microwave source for receiving the second high voltage pulse and generating microwave.

7. The system for imaging inspection of a movable object according to claim 1, wherein the moving object is a vehicle.

8. The system for imaging inspection of a movable object according to claim 7, wherein the part to be shielded is a driving cab of the vehicle.

9. A dodging method for a moving object being image inspected, comprising:
    a first determining step of judging whether the moving object moves into a passage or not;
    a second determining step of judging whether a part to be shielded of the moving object passes through a radiating scan area in the passage and generate a passing signal; and
    a scan imaging step of generating a control signal for controlling a scan imaging device to generate radiating beams according to the passing signal, after judging that the part to be shielded passes through the radiating scan area, to emit radiating beam to the passage and inspect the moving object by scanning to dodge the area to be shielded.

10. The dodging method for a moving object being image inspected according to claim 9, wherein after the first determining step further comprising:
    a step of triggering a microwave device of an accelerator of the scan imaging device for emitting the radiating beam to generate microwave when the moving object passes into the passage; and
    a step of triggering an electron beam emitting device of the accelerator to emit electron beam during the step of the scan inspection.

11. The dodging method for a moving object being image inspected according to claim 9, wherein the moving object is a vehicle.

12. The dodging method for a moving object being image inspected according to claim 9, wherein a part to be shielded is a driving cab of the vehicle.

* * * * *